United States Patent
Hodgins

(10) Patent No.: US 9,151,321 B2
(45) Date of Patent: Oct. 6, 2015

(54) PIVOT CONNECTION WITH MOTION DAMPENER

(76) Inventor: Kevin Hodgins, Prince George (CA)

(*) Notice: Subject to any disclaimer, the term of this patent is extended or adjusted under 35 U.S.C. 154(b) by 263 days.

(21) Appl. No.: 13/878,289

(22) PCT Filed: Oct. 8, 2010

(86) PCT No.: PCT/CA2010/001622
§ 371 (c)(1),
(2), (4) Date: Apr. 8, 2013

(87) PCT Pub. No.: WO2012/045144
PCT Pub. Date: Apr. 12, 2012

(65) Prior Publication Data
US 2013/0202346 A1 Aug. 8, 2013

(51) Int. Cl.
F16C 11/00 (2006.01)
F16C 11/04 (2006.01)
B66C 3/00 (2006.01)

(52) U.S. Cl.
CPC ............... *F16C 11/04* (2013.01); *B66C 3/005* (2013.01); *F16C 11/045* (2013.01); *Y10T 403/32557* (2015.01)

(58) Field of Classification Search
CPC . Y10T 403/32557; B66C 3/005; F16C 11/04; F16C 11/045
USPC .............. 403/113, 164, 165; 280/301–304; 188/83, 381; 294/119.4
See application file for complete search history.

(56) References Cited

U.S. PATENT DOCUMENTS

| | | | |
|---|---|---|---|
| 607,779 A * | 7/1898 | Welch et al. | 280/301 |
| 3,592,503 A * | 7/1971 | Lundberg | 294/119.4 |
| 3,648,978 A * | 3/1972 | Ratcliff | 254/376 |
| 4,335,914 A * | 6/1982 | Korbel | 294/119.4 |
| 4,417,759 A * | 11/1983 | Pierrot et al. | 294/119.4 |
| 4,523,782 A * | 6/1985 | Marshall | 294/65.5 |
| 4,573,728 A * | 3/1986 | Johnson | 294/119.4 |
| 4,717,191 A * | 1/1988 | Farmer | 294/119.4 |
| 4,810,020 A * | 3/1989 | Powell | 294/119.4 |
| 5,096,247 A | 3/1992 | Killen | |
| 5,451,087 A * | 9/1995 | Beaulieu | 294/119.4 |
| 5,601,161 A * | 2/1997 | Brigden | 188/83 |
| 5,713,688 A * | 2/1998 | McCallum | 403/57 |
| 5,823,588 A * | 10/1998 | Morghen | 294/89 |
| 6,145,397 A | 11/2000 | Nzeadibe et al. | |
| 6,264,013 B1 | 7/2001 | Hodgins | |
| 6,932,579 B2 | 8/2005 | Cichetti, Sr. et al. | |

FOREIGN PATENT DOCUMENTS

WO 2004/079105 A1 9/2004

* cited by examiner

*Primary Examiner* — Gregory Binda
*Assistant Examiner* — Nahid Amiri
(74) *Attorney, Agent, or Firm* — Davis & Bujold, P.L.L.C.; Michael J. Bujold

(57) ABSTRACT

A pivot connection with a locking member which includes a first body with a link with a pivot pin passage. A second body has a pair of arms with pivot pint apertures and the second body straddles the link on the first body. A polygonal boss is formed on one of the arms of the second body surrounding the pivot pin aperture. A third body is provided with a polygonal boss receiver, a pivot pin aperture and a shoulder that engages the first body to prevent relative rotation of the first and third bodies. A pivot pin extends through the pivot pin aperture of the third body, the aligned pivot pin apertures of the second body and the pivot pin passage of the first body. A pressure member engages the pivot pin to apply pressure upon the third body to maintain the polygonal boss in engagement with the boss receiver.

4 Claims, 5 Drawing Sheets

PIVOT CONNECTION WITH MOTION DAMPENER

FIELD

There is described a pivot connection with motion dampener.

BACKGROUND

U.S. Pat. No. 6,264,013 (Hodgins) entitled "Pivot connection for a grapple", describes a pivot connection which has a tapered conical counter-bored brake surface. A threaded mechanical connection applies pressure to force a tapered brake core into engagement with the brake surface. The effectiveness of this pivot connection is dependent upon pressure applied by the mechanical connection. Unfortunately, vibration can result in a loosening of the mechanical connection, which diminishes the pressure applied to force the brake core into engagement with the brake surface.

SUMMARY

There is provided a pivot connection with motion dampener which includes a first body having an exterior engagement surface and a link having a pivot pin passage. A second body is provided having a pair of arms in parallel spaced relation. Each arm has a pivot pin aperture. The second body straddles the link on the first body with the pivot pin aperture of each arm in axial alignment with the pivot pin passage of the link. A polygonal boss is integrally formed on at least one of the arms of the second body surrounding the pivot pin aperture. A third body is provided having a pivot pin aperture and a shoulder that engages the engagement surface of the first body to prevent relative rotation of the first body and the third body. The third body has a polygonal boss receiver. A pivot pin extends through the pivot pin aperture of the third body, the aligned pivot pin apertures of the second body and the pivot pin passage of the first body. A pressure member engages the pivot pin to apply pressure upon the third body to maintain the polygonal boss engaged with the polygonal boss receiver.

With the pivot connection, as described above, the polygonal boss is received in the polygonal boss receiver. Even if the pressure maintaining the polygonal boss engaged with the polygonal boss received is diminished, the engagement between two polygonal components will prevent relative rotation.

With the embodiment that will be hereinafter described the pivot pin has a remote end with threads and the pressure member is a rotatable fastener which engages the threads on the pivot pin to exert clamping pressure upon the third body. Although a rotatable fastener is a common type of pressure member, it will be appreciated that there are other types of fasteners that may be used. For example, the shaft could have a plurality of rings and the fastener could slide into position and engage a selected one of the rings.

With the embodiment that will hereinafter be described the polygonal boss receiver has four sides. It will be appreciated that a three sided or five sided polygonal boss would also prevent rotation. Although a six sided, seven sided, eight sided or nine sided polygonal boss will also have utility. However, there may come a point at which there are so many sides and they are so small in length that there is a danger of stripping the engagement. Subject to this practical limitation, a polygonal engagement between the components will prevent relative rotation.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
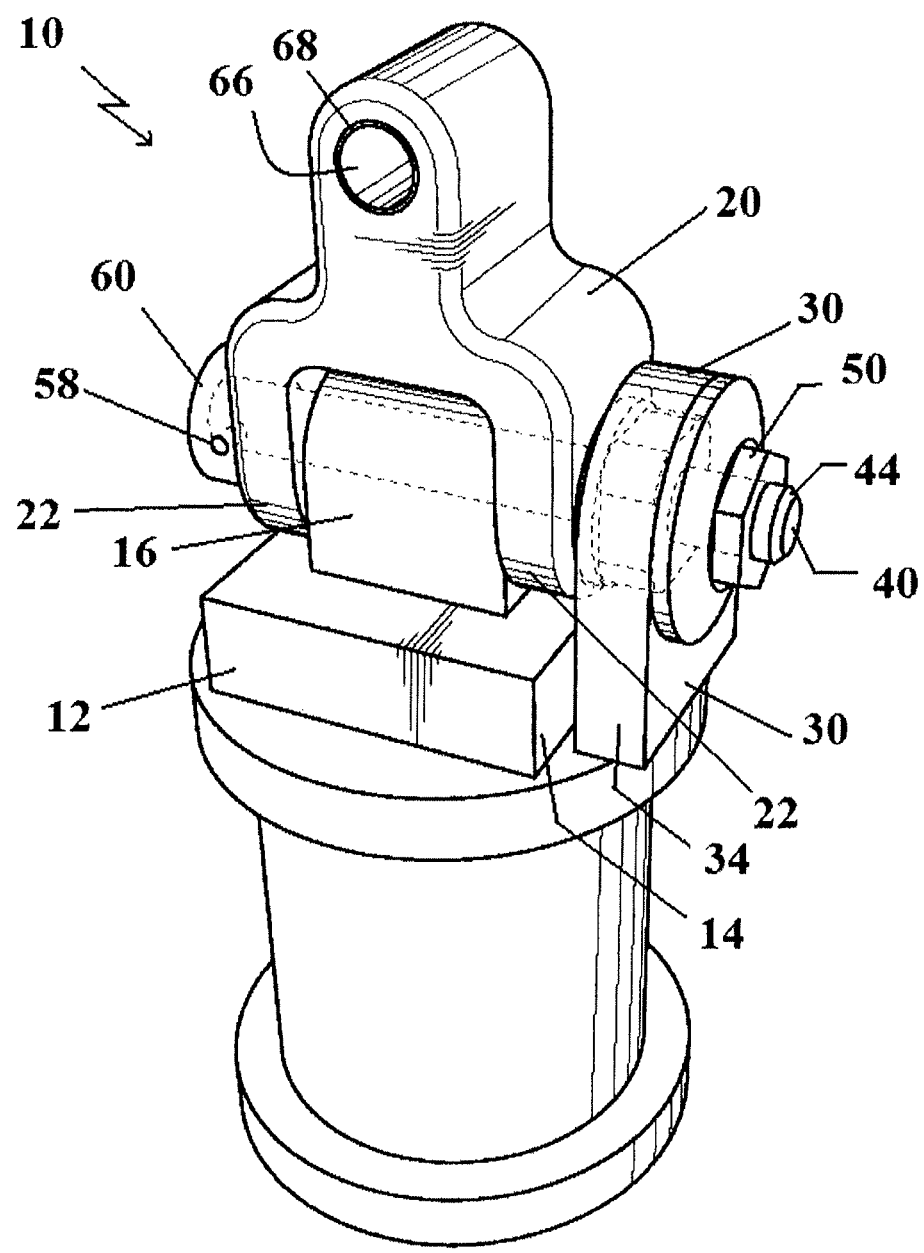
FIG. 1 is a perspective view of a pivot connection with motion dampener.

A pivot connection with motion dampener generally identified by reference numeral 10, will now be described with reference to FIG. 1 through 5.

Figure 4:
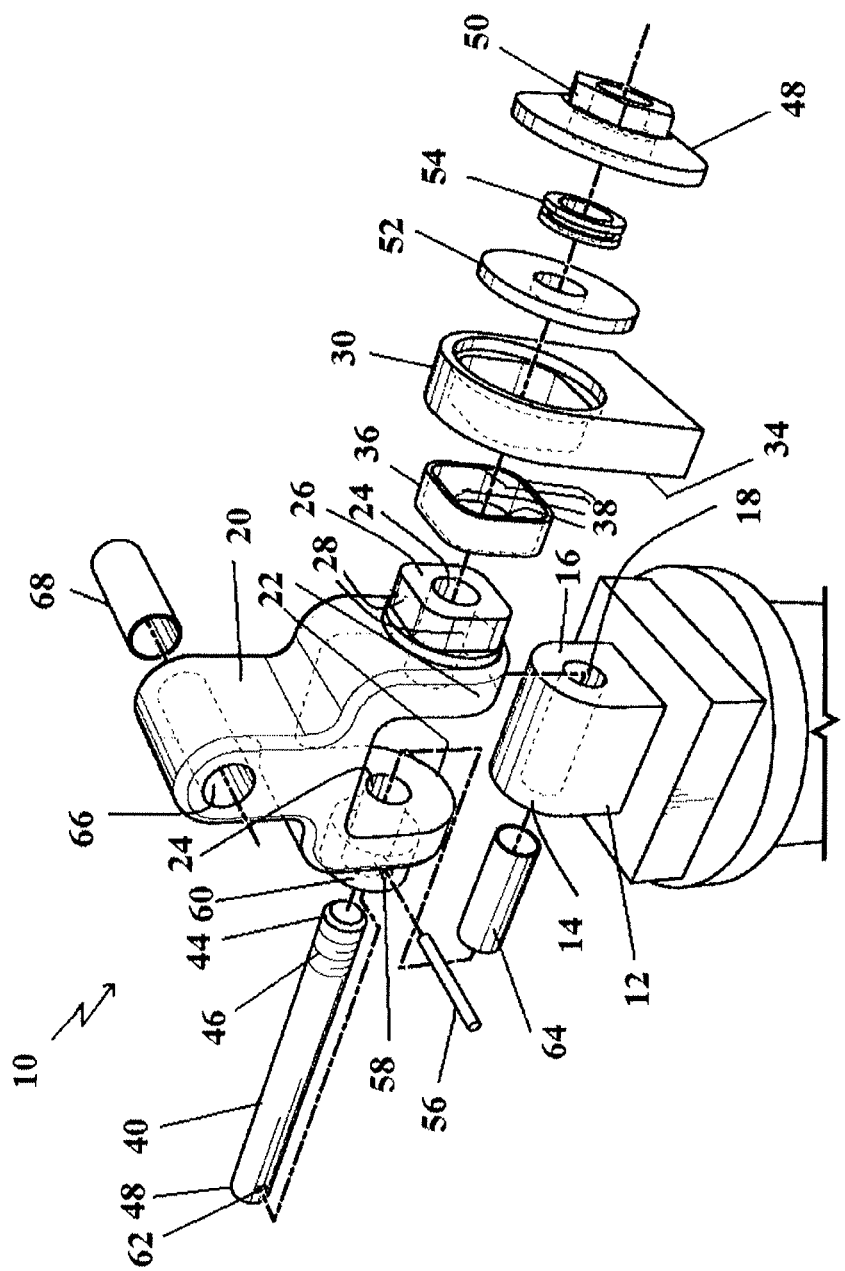
FIG. 4 is a exploded view of the pivot connection.

Structure and Relationship of Parts:

Referring to FIG. 1, there is illustrated a pivot connection with motion dampener generally referenced by numeral 10. Referring to FIG. 4, pivot connection 10 has a first body 12 that has an exterior engagement surface 14 and a link 16 with a pivot pin passage 18.

Figure 2:
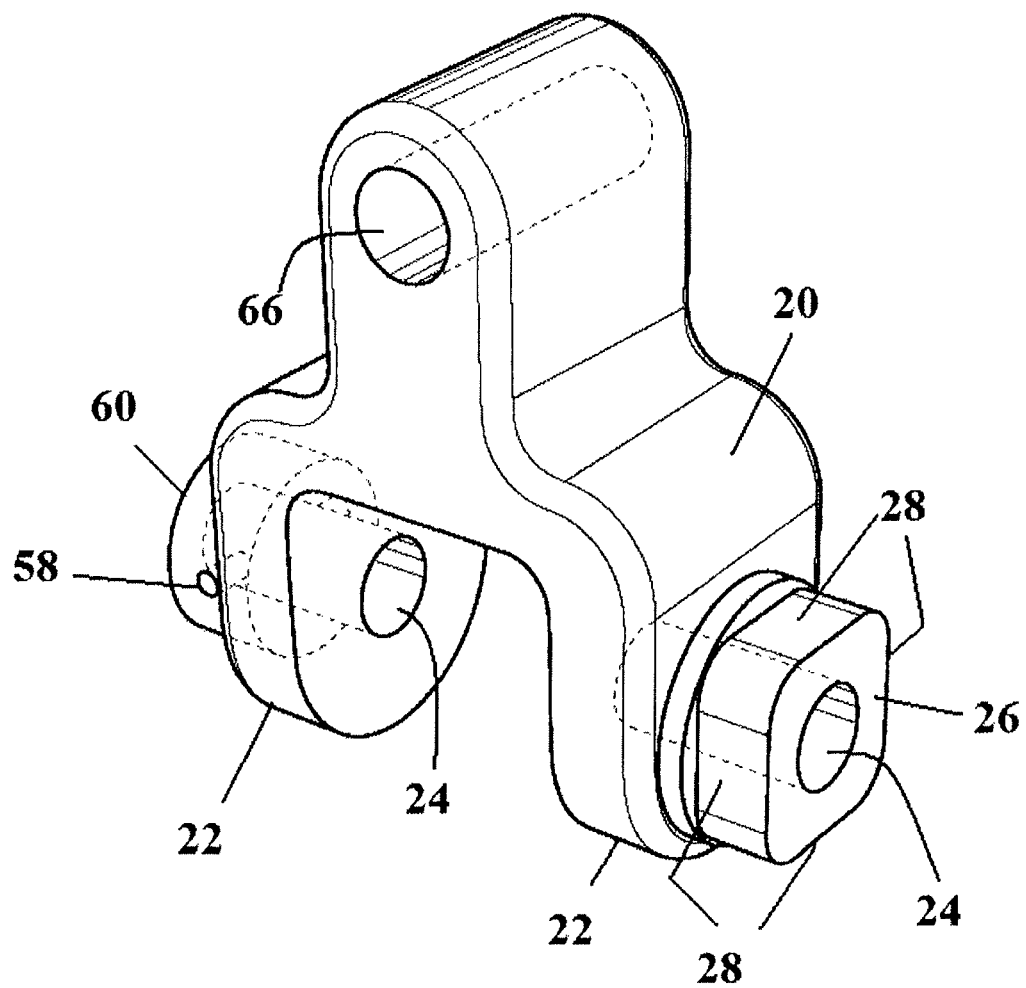
FIG. 2 is a perspective view of the second body of the pivot connection.

Referring to FIG. 2, a second body 20 is provided which has a pair of arms 22 in parallel spaced relation. Each arm 22 has a pivot pin aperture 24. Referring to FIG. 1, second body 20 straddles link 16 on first body 12 with pivot pin aperture 24 of each arm 22 in axial alignment with pivot pin passage 18 of link 16, illustrated in FIG. 4.

Referring to FIG. 2, a polygonal boss 26 is integrally formed on one of arms 22 of second body 20 surrounding pivot pin aperture 24. In the illustrated embodiment 10, polygonal boss 26 is shown has having four sides 28, it will be appreciated that it could have as few as three sides 28 or as many as nine or more as long as the polygonal engagement can be maintained without slippage.

Figure 3:
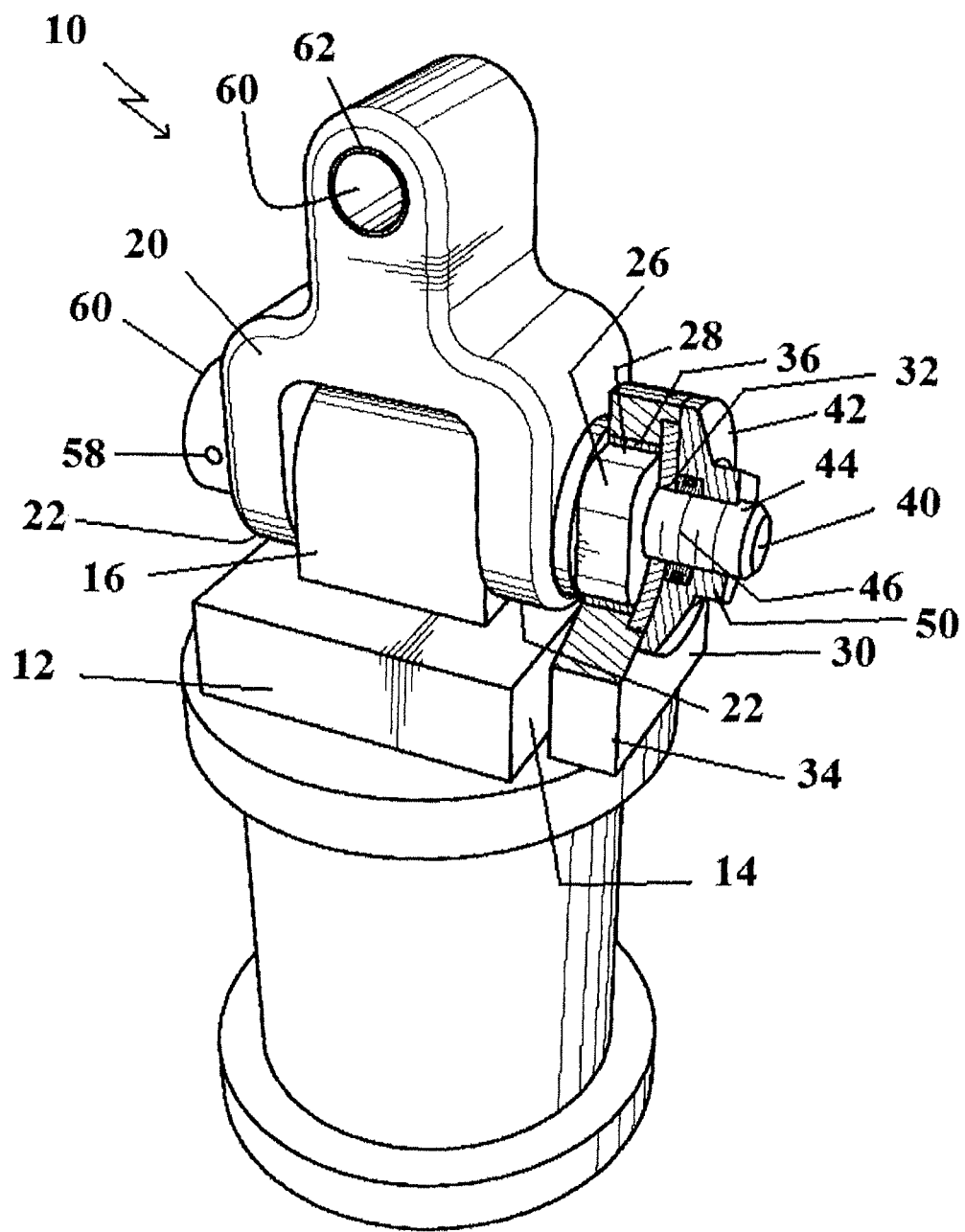
FIG. 3 is a perspective view of the pivot connection with a cutaway portion.

Referring to FIG. 3, a third body 30 is provided which has a pivot pin aperture 32 and a shoulder 34 that engages upper and lower engagement surfaces 14 of first body 12 to prevent relative rotation of first body 12 and third body 30. While the illustrated embodiment shows shoulder 34 that engages upper and lower engagement surfaces 14 of first body 12 to prevent relative rotation of first body 12 and third body 30, it will be appreciated that a positive engagement such as a dowel or interlock could also be used to prevent such movement. Referring to FIG. 4, third body 30 has a polygonal boss receiver 36. Polygonal boss receiver is illustrated as having four sides 38, but will have as many sides as necessary to receive polygonal boss 26.

Referring to FIG. 1 and FIG. 4, a pivot pin 40 extends through pivot pin aperture 32 of third body 30 as well as aligned pivot pin apertures 24 of second body 20 and pivot pin passage 18 of first body 12. Referring to FIG. 1, a pressure member, generally identified by reference numeral 42, engages pivot pin 40 to apply pressure upon third body 30 to maintain polygonal boss 26 engaged with polygonal boss receiver 36.

Referring to FIG. 4, pivot pin 40 has a remote first end 44 with threads 46 and a second end 48. Pressure member 42 has incorporated into it a rotatable fastener 50 which engages threads 46 on pivot pin 40 to exert clamping pressure upon third body 30. Although rotatable fastener 50 is illustrated, it will be appreciated that there are other types of pressure members that may be used. By way of example, pivot pin 40 could have a plurality of rings and the fastener could slide into position and engage a selected one of the rings. A washer 52 and lock washer 54 are disposed between rotatable fastener 50 and third body 30.

A locking pin 56 is inserted through a locking pin aperture 58 in a lug 60 provided on one of arms 22 of second body 20 surrounding pivot pin aperture 24. Locking pin 56 is engages a bore 62 on second end 48 of pivot pin 40 to prevent removal of pivot pin 40. A bushing 64 is provided in pivot pin passage 18.

Referring to FIG. 4, an aperture 66 is provided to facilitate suspending second body 20. A bushing 68 is provided in aperture 66.

Operation:

Referring to FIG. 3 and FIG. 4, with pivot connection 10, as described above, pivot pin 40 extends through pivot pin aperture 32 of third body 30 as well as aligned pivot pin apertures 24 of second body 20 and pivot pin passage 18 of first body 12. Referring to FIG. 3, pressure member 42 engages pivot pin 40 to apply pressure upon third body 30 to maintain polygonal boss 26 engaged with polygonal boss receiver 36. As polygonal boss 26 is received in the polygonal boss receiver 36, even if the pressure maintaining polygonal boss 26 engaged with the polygonal boss receiver 36 is diminished, the engagement between the flat sides of polygonal boss 26 and polygonal boss receiver 36 will prevent relative rotation.

Pivot connection with motion dampener 10 can be used in a variety of applications including but not limited to use with a grapple, forest harvesting heads, "free swinging" attachments for cranes, recycling equipment, truck mounted self-loading cranes, free swinging baskets, and similar applications.

Figure 5:
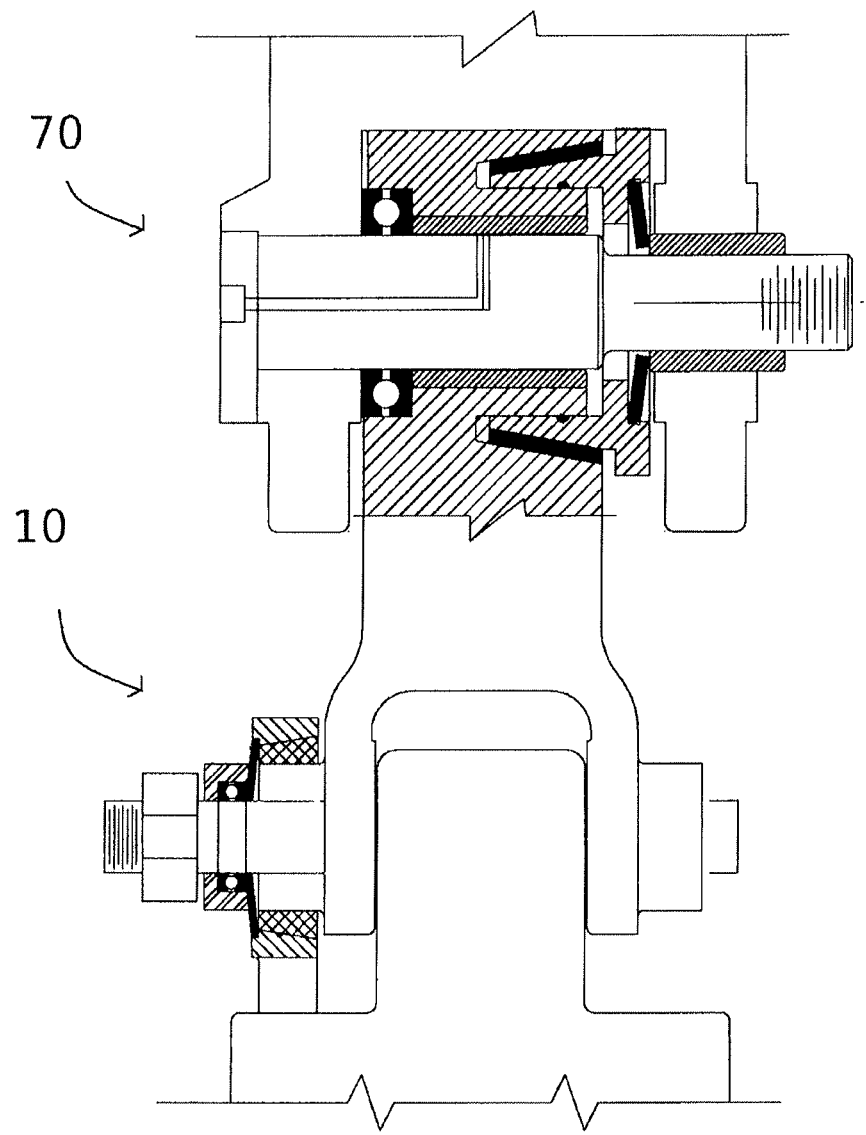
FIG. 5 is a side elevation view, in section, of the pivot connection of FIG. 1 in combination with another pivot connection.

Referring to FIG. 1 through FIG. 4, pivot connect 10 is illustrated as a single connection although it can be combined with another pivot connection 70 as illustrated in FIG. 5. Pivot connection 70 can be of internal or external configuration.

Variations:

As noted above and referring to FIG. 1, while the illustrated embodiment shows shoulder 34 that engages upper and lower engagement surfaces 14 of first body 12 to prevent relative rotation of first body 12 and third body 30, it will be appreciated that a positive engagement such as a dowel or interlock could also be used instead to prevent such movement.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted.

Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A pivot connection with locking element, comprising:
    a first body having an exterior surface and a link protruding from the exterior surface, the link having a pivot pin passage;
    a second body having a pair of arms in parallel spaced relation, each arm having a pivot pin aperture, the second body straddling the link on the first body with the pivot pin aperture of each arm in axial alignment with the pivot pin passage of the link;
    a polygonal boss integrally formed on at least one of the arms of the second body surrounding the pivot pin aperture;
    a boss receiver having an interior surface to engage the boss and an exterior surface;
    a third body having an engagement that engages the first body to prevent relative rotation of the first body and a boss receiver receiving aperature, the third body, and the third body receiving the exterior surface of the boss receiver within the aperture;
    a pivot pin extending through the aperture of the third body, and the aligned pivot pin apertures in each arm of the second body and the pivot pin passage in the link of the first body to pivotally connect the first body and the second body, the pivot pin serving to suspend the first body from the second body, the first body being capable of a swinging pivotal movement relative to the second body; and
    a pressure member engaging the pivot pin to apply a selected pressure upon the third body to maintain the polygonal boss of the second body selectively engaged with the boss receiver positioned in the aperature of the third body to prevent relative rotation of the second body and the third body, the engagement of the third body engaging the first body to prevent relative rotation of the first body and the third body such that relative pivoting movement between the first body and the second body is dampened.

2. The pivot connection according to claim 1, wherein the pivot pin has a remote end with threads and the pressure member is a rotatable fastener which engages the threads on the pivot pin to exert clamping pressure upon the third body.

3. The pivot connection according to claim 1, wherein the polygonal boss has at least three sides and not more than nine sides.

4. The pivot connection according to claim 3, wherein the interior surface of the polygonal boss receiver has four sides.

* * * * *